(12) United States Patent
Tsukamoto

(10) Patent No.: US 7,012,870 B2
(45) Date of Patent: Mar. 14, 2006

(54) OPTICAL RECORDING METHOD, OPTICAL RECORDING MEDIUM AND OPTICAL IRRADIATING TIME CONTROLLING DEVICE

(75) Inventor: Syuji Tsukamoto, Tokyo (JP)

(73) Assignee: TDK Corporation, Tokyo (JP)

( * ) Notice: Subject to any disclaimer, the term of this patent is extended or adjusted under 35 U.S.C. 154(b) by 720 days.

(21) Appl. No.: 10/107,163

(22) Filed: Mar. 28, 2002

(65) Prior Publication Data

US 2002/0141316 A1    Oct. 3, 2002

Related U.S. Application Data

(60) Provisional application No. 60/279,756, filed on Mar. 30, 2001, provisional application No. 60/279,689, filed on Mar. 30, 2001.

(51) Int. Cl.
*G11B 5/09* (2006.01)

(52) U.S. Cl. .................... 369/59.11; 369/47.51

(58) Field of Classification Search ............ None
See application file for complete search history.

(56) References Cited

U.S. PATENT DOCUMENTS 6,370,097 B1 *  4/2002  Hayashi et al. .......... 369/59.11
2001/0036143 A1  11/2001  Ohono et al.

FOREIGN PATENT DOCUMENTS

| JP | 61-211835 | 9/1986 |
|----|-----------|--------|
| JP | 62-164590 | 7/1987 |
| JP | 1-154328  | 6/1989 |
| JP | 1-182846  | 7/1989 |
| JP | 2-278535  | 11/1990 |
| JP | 2-504196  | 11/1990 |
| JP | 3-228227  | 10/1991 |
| JP | 4-044642  | 2/1992 |
| JP | 5-205276  | 8/1993 |
| JP | 8-077599  | 3/1996 |
| JP | 2634827   | 4/1997 |
| JP | 10-027396 | 1/1998 |

* cited by examiner

*Primary Examiner*—Paul W. Huber
(74) *Attorney, Agent, or Firm*—Oliff & Berridge, PLC

(57) ABSTRACT

An optical recording method for irradiating an optical recording medium 10 with a laser beam to form recording marks 48A to 48G. The method includes defining contiguously a virtual recording cell 40 in a displacement direction S on the recording layer 12, setting reference irradiating time with the laser beam to five stages or more, and defining a predetermined waiting time in a neighboring subsequent virtual recording cell 40, corresponding to the length of the reference irradiating time in the preceding virtual recording cell 40. The method also includes setting actual irradiating time by subtracting the waiting time from the reference irradiating time for irradiation of the aforementioned subsequent virtual recording cell 40. The method further includes irradiating with the laser beam during the aforementioned actual irradiating time by delaying the irradiation initiation timing by the waiting time to form at least five types of recording marks 48A to 48G having different sizes, thereby performing multi-level recording of information.

24 Claims, 11 Drawing Sheets

OPTICAL RECORDING METHOD, OPTICAL RECORDING MEDIUM AND OPTICAL IRRADIATING TIME CONTROLLING DEVICE

This is a non-provisional application claiming the benefit of U.S. Provisional Application Nos. 60/279,689 and 60/279,756, both filed on Mar. 30, 2001.

DETAILED DESCRIPTION OF THE INVENTION

1. Field of the Invention

The present invention relates to an optical recording method for performing multi-level recording by forming a plurality of types of recording marks in accordance with data made available for recording, an optical recording medium, and an irradiating time controlling device for a laser beam used for recording the data thereon.

2. Description of the Prior Art

A number of studies have been made on a method for recording data on a prior-art optical recording medium by changing the length of a read signal (the length of a reflected signal modulating portion) in a multi-stage manner. In contrast, a number of studies have also been made on a method for recording a plurality of data on each signal of the same length by changing the depth of the read signal (the degree of modulating a reflected signal) in a multi-stage manner.

According to this optical recording method, a plurality of data can be recorded in the direction of depth in comparison with the recording of binary data using simply the presence and absence of a pit. Thus, this makes it possible to increase the amount of signals to be assigned to a given length, thereby allowing the linear recording density to be improved. In the method for changing the depth of a read signal in a multi-stage manner, the power of a laser beam is in general changed in a multi-stage manner to form different types of recording marks in some aspect. Recently, such methods have been suggested which make use of hologram or have multi-layered recording layers.

Incidentally, it is herein referred to as multi-level recording to record a plurality of types of recording data having different degrees of modulation of reflected signals from each other.

On the other hand, in the optical recording method related to the multi-level recording, there was such a problem that the method provided a signal of more deteriorated quality upon reading as the power of the laser beam upon recording increased, or the depth of a reflected signal formed increased. The reason for this has not yet been made clear even now.

For example, a recording mark was made shorter to provide the recording medium with higher density to record more information thereon using the prior-art method and allowed multi-level recording therein by changing the power of the laser beam in a multi-stage manner. In this case, the quality of signal was distinctly deteriorated. That is, the prior-art method had a problem that employing the multi-level recording would make it difficult to provide the recording mark with a higher density, thus making the situation mutually exclusive.

In addition, the concept of the prior-art optical recording method for performing the multi-level recording by changing the power of the laser beam in a multi-stage manner is based on the precondition that the recording mark length is larger than the diameter of the convergent beam (beam waist) upon recording.

In general, the diameter of a convergent beam is expressed by $K\lambda/NA$ (where K is a constant, $\lambda$ is the wavelength of the laser beam, and NA is the numerical aperture of the lens). A pickup for use with a CD has typically $\lambda=780$ nm, and NA=0.45, giving the diameter of the convergent beam equal to about 1.6 $\mu$m. In this case, with the recording mark being at around 1.6 $\mu$m in length, the aforementioned problem of signal deterioration becomes apparent. Thus, it was difficult to perform five stages or more of multi-level recording by the method for changing the power of the laser beam.

The aforementioned problems are conceivably resulted from many factors such as the setting of the power of a laser beam and the properties of a recording medium, intertwined with one another. To the inventor's knowledge, the cause of the problems has not yet been made clear until now. Thus, it is the current situation that the high-density multi-level recording has not yet been achieved including the recording method thereof.

SUMMARY OF THE INVENTION

The present invention was developed in view of the aforementioned problems. It is therefore the object of the present invention to suggest a new multi-level recording method to achieve a high-density multi-level recording.

The inventor has made intensive studies on the optical recording medium and found a recording method for performing multi-stage recording thereon. Thus, the inventor has confirmed that it is possible to perform five stages or more of high-density multi-level recording on an optical recording medium.

That is, the present invention described below makes it possible to achieve the aforementioned object.

(1) An optical recording method for irradiating an optical recording medium having a recording layer on an optically transparent substrate with a laser beam to form a recording mark, comprising the steps of: defining contiguously, on said recording layer, a virtual recording cell having a given unit length in a displacement direction relative to that of said laser beam and having a given unit width in a direction orthogonal thereto, along said displacement direction, setting reference irradiating time of said virtual recording cell with said laser beam to five stages or more, irradiating with a laser beam of zero power or weak enough not to form a recording mark after irradiating with said laser beam for recording on a preceding virtual recording cell, and irradiating with a laser beam of zero power or weak enough not to form a recording mark before irradiating with a laser beam for recording on a neighboring subsequent virtual recording cell, and forming at least five types of recording marks having different sizes on said plurality of virtual recording cells to perform multi-level recording of information by modulating an optical reflectivity based on an area ratio to said virtual recording cell.

(2) The optical recording method according to claim (1), further comprising the steps of: defining a predetermined waiting time for said neighboring subsequent virtual recording cell, corresponding to the length of said reference irradiating time for said preceding virtual recording cell, and setting an actual irradiating time by subtracting said waiting time from said reference irradiating time for irradiating said subsequent virtual recording cell and delaying irradiation initiation timing by said waiting time to irradiate with a laser beam during said actual irradiating time, thereby performing multi-level recording of information.

(3) The optical recording method according to (1), further comprising the steps of: defining a predetermined waiting time for said neighboring subsequent virtual recording cell, in consideration of the amount heat stored by irradiating said preceding virtual recording cell with said laser beam, and setting an actual irradiating time by subtracting said waiting time from said reference irradiating time for irradiating said subsequent virtual recording cell and delaying irradiation initiation timing by said waiting time to irradiate with a laser beam during said actual irradiating time, thereby performing multi-level recording of information.

(4) The optical recording method according to (2) or (3), further comprising the steps of: forming said plurality of recording marks by temporarily setting waiting time to approximately zero in a test recording region prepared on said optical recording medium, measuring whether the amount of heat stored in a preceding recording mark in said neighboring recording mark affects the formation of a subsequent recording mark, by reading the recording mark, and defining said predetermined waiting time by repeatedly increasing said waiting time gradually until said amount of heat provides an effect equal to or less than a predetermined allowable value to form and measure said plurality of recording marks.

(5) The optical recording method according to (1), further comprising the steps of: an irradiation power of said laser beam, setting at least three stages of cooling power, waiting power, and recording power for forming said recording mark, so as to provide greater power in that order, setting recording irradiating time to five stages or more for irradiation of said virtual recording cell at said recording power, irradiating said virtual recording cell at said cooling power until predetermined time has elapsed from the termination of irradiation at said recording power, moreover, irradiating said subsequent virtual recording cell at said waiting power until irradiation at said recording power is initiated after the irradiation at said cooling power has been terminated, and irradiating said plurality of virtual recording cells at said recording power for the recording irradiating time modulated to five stages or more, thereby forming at least five types of recording marks having different sizes and performing multi-level recording of information.

(6) The optical recording method according to (5), wherein a phase changing recording layer is employed as said recording layer, the phase changing recording layer being irradiated with a laser beam at said recording power to become amorphous and irradiated with a laser beam at said waiting power to become crystalline, and said virtual recording cell can be subjected to repeated multi-level recording.

(7) The optical recording method according to (5) or (6), wherein the irradiating time at said cooling power is always made constant.

(8) The optical recording method according to (5), (6), or (7), wherein the longer said recording irradiating time at said preceding recording power, the shorter the irradiating time at said waiting power is set.

(9) The optical recording method according to (8), wherein when said recording irradiating time assigned to said virtual recording cell is at least the longest of said five stages or more, the subsequent irradiating time at said waiting power is set generally to zero.

(10) The optical recording method according to any one of (1) to (9), wherein recording marks to be recorded onto said virtual recording cell include at least a recording mark smaller in size than a beam spot of said laser beam.

(11) An optical recording medium, comprising a recording layer on an optically transparent substrate, allowing said recording layer to be irradiated with a laser beam to form a recording mark therein, wherein by an optical recording method, five types of more of recording marks having different sizes are formed in said plurality of virtual recording cells, the optical recording method comprises the steps of: defining contiguously, on said recording layer, a virtual recording cell having a given unit length in a displacement direction relative to that of said laser beam and having a given unit width in a direction orthogonal thereto, along said displacement direction, setting reference irradiating time of said virtual recording cell with said laser beam to five stages or more, irradiating with a laser beam of zero power or weak enough not to form a recording mark after irradiating with said laser beam for recording on a preceding virtual recording cell, and irradiating with a laser beam of zero power or weak enough not to form a recording mark before irradiating with a laser beam for recording on a neighboring subsequent virtual recording cell, and forming at least five types of recording marks having different sizes on said plurality of virtual recording cells to perform multi-level recording of information by modulating an optical reflectivity based on an area ratio to said virtual recording cell.

(12) The optical recording medium according to (11), wherein the optical recording method further comprises the steps of: defining a predetermined waiting time for said neighboring subsequent virtual recording cell corresponding to the length of said reference irradiating time for said preceding virtual recording cell, and setting an actual irradiating time by subtracting said waiting time from said reference irradiating time for irradiating said subsequent virtual recording cell and delaying irradiation initiation timing by said waiting time to irradiate with a laser beam during said actual irradiating time, thereby performing multi-level recording of information.

(13) The optical recording medium according to (11), wherein the optical recording method further comprises the steps of: defining a predetermined waiting time for said neighboring subsequent virtual recording cell, in consideration of the amount heat stored by irradiating said preceding virtual recording cell with said laser beam, and setting an actual irradiating time by subtracting said waiting time from said reference irradiating time for irradiating said subsequent virtual recording cell and delaying irradiation initiation timing by said waiting time to irradiate with a laser beam during said actual irradiating time, thereby performing multi-level recording of information.

(14) The optical recording medium according to (12) wherein, the optical recording method further comprises the steps of: forming said plurality of recording marks by temporarily setting waiting time to approximately zero in a test recording region prepared on said optical recording medium, measuring whether the amount of heat stored in a preceding recording mark in said neighboring recording mark affects the formation of a subsequent recording mark, by reading the recording mark, and defining said predetermined waiting time by repeatedly increasing said waiting time gradually until said amount of heat provides an effect equal to or less than a predetermined allowable value to form and measure said plurality of recording marks.

(15) The optical recording medium according to (11), wherein the optical recording method further comprises the steps of: an irradiation power of said laser beam, setting at least three stages of cooling power, waiting power, and recording power for forming said recording mark, so as to provide greater power in that order, setting recording irradiating time to five stages or more for irradiation of said virtual recording cell at said recording power, irradiating said virtual recording cell at said cooling power until predetermined time has elapsed from the termination of irradiation at said recording power, moreover, irradiating said subsequent virtual recording cell at said waiting power until irradiation at said recording power is initiated after the irradiation at said cooling power has been terminated, and irradiating said plurality of virtual recording cells at said recording power for the recording irradiating time modulated to five stages or more, thereby forming at least five types of recording marks having different sizes and performing multi-level recording of information.

(16) The optical recording medium according to (15), wherein a phase changing recording layer is employed as said recording layer, the phase changing recording layer being irradiated with a laser beam at said recording power to become amorphous and irradiated with a laser beam at said waiting power to become crystalline, and said virtual recording cell can be subjected to repeated multi-level recording.

(17) The optical recording medium according to (15), wherein the irradiating time at said cooling power is always made constant.

(18) The optical recording medium according to (15), wherein the longer said recording irradiating time at said preceding recording power, the shorter the irradiating time at said waiting power is set.

(19) The optical recording medium according to (18), wherein when said recording irradiating time assigned to said virtual recording cell is at least the longest of said five stages or more, the subsequent irradiating time at said waiting power is set generally to zero.

20. The optical recording medium according to (1), wherein recording marks to be recorded onto said virtual recording cell include at least a recording mark smaller in size than a beam spot of said laser beam.

21. An optical recording medium, comprising a recording layer on an optically transparent substrate, allowing the recording layer to be irradiated with a laser beam to form a recording mark therein, wherein on said recording layer, a virtual recording cell having a given unit length in a displacement direction relative to that of said laser beam and having a given unit width in a direction orthogonal thereto is defined contiguously along said displacement direction, reference irradiating time of said virtual recording cell with said laser beam is set to five stages or more, a predetermined waiting time for said neighboring subsequent virtual recording cell is defined, corresponding to the length of said reference irradiating time for said preceding virtual recording cell, an actual irradiating time is set by subtracting said waiting time from said reference irradiating time for irradiating said subsequent virtual recording cell and delaying irradiation initiation timing by said waiting time to irradiate with a laser beam during said actual irradiating time, and at least five types of recording marks having different sizes formed on said plurality of virtual recording cells to perform multi-level recording of information by modulating an optical reflectivity based on an area ratio to said virtual recording cell.

22. An optical recording medium, comprising a recording layer on an optically transparent substrate, allowing the recording layer to be irradiated with a laser beam to form a recording mark therein, wherein on said recording layer, a virtual recording cell having a given unit length in a displacement direction relative to that of said laser beam and having a given unit width in a direction orthogonal thereto is defined contiguously along said displacement direction, reference irradiating time of said virtual recording cell with said laser beam is set to five stages or more, and a predetermined waiting time is defined for said neighboring subsequent virtual recording cell in consideration of the amount of heat stored by irradiating said preceding virtual recording cell with said laser beam, an actual irradiating time is set by subtracting said waiting time from said reference irradiating time for irradiating said subsequent virtual recording cell and delaying irradiation initiation timing by said waiting time to irradiate with a laser beam during said actual irradiating time, and at least five types of recording marks having different sizes formed on said plurality of virtual recording cells to perform multi-level recording of information by modulating an optical reflectivity based on an area ratio to said virtual recording cell.

23. The optical recording medium according to (21) or (22), wherein said plurality of recording marks are formed by temporarily setting waiting time to approximately zero in a test recording region prepared on said optical recording medium, whether the amount of heat stored in a preceding recording mark in said neighboring recording mark affects the formation of a subsequent recording mark is measured by reading the recording mark, and said predetermined waiting time is defined by repeatedly increasing said waiting time gradually until said amount of heat provides an effect equal to or less than a predetermined allowable value to form and measure said plurality of recording marks, thereby performing multi-level recording of information.

24. An optical recording medium, comprising a recording layer on an optically transparent substrate, allowing the recording layer to be irradiated with a laser beam to form a recording mark therein, wherein on said recording layer, a virtual recording cell having a given unit length in a displacement direction relative to that of said laser beam and having a given unit width in a direction orthogonal thereto is defined contiguously along said displacement direction, as irradiation power of said laser beam, at least three stages of cooling power, waiting power, and recording power for forming said recording mark are set so as to provide greater power in that order, recording irradiating time is set to five stages or more for irradiation of said virtual recording cell at said recording power, said virtual recording cell is irradiated at said cooling power until predetermined time has elapsed from the termination of irradiation at said recording power, moreover, said subsequent virtual recording cell is irradiated at said waiting power until irradiation at said recording power is initiated after the irradiation at said cooling power has been terminated, and said plurality of virtual recording cells are irradiated at said recording power for the recording irradiating time modulated to five stages or more, thereby forming at least five types of recording marks having different sizes and performing multi-level recording of information.

25. The optical recording medium according to (24), wherein a phase changing recording layer is employed as said recording layer, the phase changing recording layer being irradiated with a laser beam at said recording power to become amorphous and irradiated with a laser beam at said waiting power to become crystalline.

26. The optical recording medium according to (24) or (25), wherein the irradiating time at said cooling power is always made constant.

27. The optical recording medium according to (24), (25), or (26), wherein the longer said recording irradiating time at said preceding recording power, the shorter the irradiating time at said waiting power is set.

28. The optical recording medium according to claim (27), wherein when said recording irradiating time assigned to said virtual recording cell is at least the longest of said five stages or more, the subsequent irradiating time at said waiting power is set generally to zero.

29. An irradiating time controlling device for controlling irradiating time of a laser beam used for forming a recording mark on an optical recording medium having a recording layer on an optically transparent substrate, comprising a cell time setting portion for defining contiguously a predetermined cell time to thereby allow a virtual recording cell to be set contiguously at said recording layer corresponding to said cell time, a reference irradiating time setting portion for defining five stages or more of reference irradiating time within said cell time, an assignment processing portion for assigning said reference irradiating time to each of said plurality of cell times corresponding to a due recording mark, an actual irradiating time calculating portion for calculating waiting time in said subsequent neighboring cell time, corresponding to the length of said reference irradiating time assigned to said preceding cell time, and for determining actual irradiating time by subtracting said waiting time from said reference irradiating time assigned to said subsequent cell time, and an irradiation command portion 68 for providing a laser with a power ON timing delayed by said waiting time in said cell time, and for commanding said laser to maintain the power ON state over said actual irradiating time.

The inventor has found that it is made possible to perform multi-level recording by employing a new idea that allows no modulation of the power of a laser beam upon recording but the modulation of the irradiating time of the laser beam. Consequently, this idea has lead to a dramatic increase in recording density.

However, it was also found that the formation of a recording mark simply by modulating the irradiating time would make it impossible in some cases to positively read the recording mark.

A further analysis made by the inventor shown that the relationship between the neighboring recording marks is a critical factor in increasing the accuracy of reading in the high-density multi-level method for forming a recording mark one by one on a virtual recording cell. In particular, it was found that the amount of heat stored in a recording cell upon forming the preceding recording mark possibly causes a deviation in reflectivity upon forming a recording mark on the subsequent virtual recording cell.

In this context, the present invention was adapted to ensure waiting time in the subsequent virtual recording cell in consideration of the amount of heat stored in the preceding recording mark. The waiting time is supposed to prohibit the irradiation of a laser beam. This makes the actual irradiating time shorter than the due reference irradiating time. Furthermore, this causes irradiation to be initiated being delayed from the due irradiation initiation timing by the waiting time.

This allows the stored heat of the preceding recording mark to be assigned to the lacking amount of heat corresponding to the waiting time, eventually providing the due recording mark or due optical reflectivity (of a virtual recording cell). This makes it possible to reduce each virtual recording cell in size to allow recording marks to sit closer to each other, thereby allowing the recording density of the optical recording medium to be increased.

Incidentally, it is preferable that the recording layer of the aforementioned optical recording medium is formed including an organic dye. The inventor has actually confirmed that this makes it possible to achieve five stages or more of multi-level recording.

The high-density multi-level method for forming a multi-stage recording mark on a virtual recording cell has a final target of setting the optical reflectivity with good accuracy on each virtual recording cell. Accordingly, an analysis made by the inventor has shown a high possibility that a delicate effect (deviation) is exerted on the optical reflectivity of the virtual recording cell not during the aggressive irradiation of a laser beam to form a recording mark but by irradiation of a laser beam during other period of time (i.e., during irradiation not intended to form a recording mark). This is considered one of the factors that reduce the certainty upon reading information on the optical recording medium.

That is, it has been already mentioned that virtual recording cells are set contiguously in the direction of displacement relative to the laser beam with which the cells are irradiated, and the effect of the neighboring virtual memory cells cannot be ignored because of the contiguousness of the cells.

For example, suppose that a recording mark in a preceding virtual recording cell has been recorded with the maximum amount of accumulated light (for the longest reference irradiating time). In this case, it is apparent that the amount of laser heat possessed at the termination of the recording is larger than in the case where the recording mark is recorded with the minimum amount of accumulated light (for the shortest recording irradiating time) In addition to this, suppose that the recording mark is formed with the maximum amount of accumulated light at a preceding virtual recording cell. In this case, the time from the completion of the recording to the timing at which the subsequent virtual recording cell is irradiated is shorter than in the case where a recording mark is recorded with the minimum amount of accumulated light at the preceding virtual recording cell. Accordingly, it is not possible to obtain time enough to discharge the aforementioned amount of heat, thereby making the recording unstable at the subsequent virtual recording cell.

In this context, as the irradiation power of a laser beam, the present invention has set two values of waiting power and cooling power in addition to the recording power for aggressively forming a recording mark. After a recording mark is formed at a virtual recording cell at the recording power, the cell is irradiated at the weakest cooling power (i.e., the power exerting the least effect on optical reflectivity), thereby making it possible to allow the optical reflectivity of the virtual recording cell to converge to a predetermined value. If the cell was irradiated at a power of a certain magnitude, the optical reflectivity would deviate from the desired one.

Furthermore, after a cell is irradiated at the cooling power for a predetermined time, the power is changed to the waiting power higher than the cooling power for the irradiation of the cell. Accordingly, this makes it possible to instantly raise the energy delivered by the laser beam to the recording power at the subsequent virtual recording cell. Consequently, this ensures an accurate optical reflectivity at the virtual recording cell. If both the optical recording medium and the laser were cooled down excessively by the cooling power, the subsequent recording power would be reached with an unstable delay. Thus, there is a possibility that the optical reflectivity cannot be obtained as desired.

As described above, in the multi-level recording, the cooling power, the waiting power, and the recording power are used under the reasonable concept of "setting the optical reflectivity of a virtual recording cell with high accuracy". This makes it possible to set five stages or more of optical reflectivity at a virtual recording cell.

From such a reason, a method (delay strategy), disclosed in other publication by the present applicant, for using the amount of heat residual in a preceding virtual recording cell for recording at the subsequent virtual recording cell may be employed at the same time, thereby providing a further desirable result.

Incidentally, the present invention described above may be added by the following arrangement.

An optical recording method for modulating the optical reflectivity of the entire virtual recording cell, with the area occupation ratio of the recording mark formed within the aforementioned virtual recording cell to the aforementioned virtual recording cell, in order to perform five stages or more of multi-level recording of information.

An optical recording medium characterized in that a groove for guiding a laser beam is provided along the recording layer, the virtual recording cell is set within the groove, and the unit width is made generally equal to the width of the groove.

An optical recording medium characterized in that particular information indicative of a multi-level recording medium is recorded in the virtual recording cell.

An optical recording medium characterized in that a groove for guiding a laser beam is provided along the recording layer, and the groove is partly discontinued.

DETAILED DESCRIPTION OF THE PREFERRED EMBODIMENTS

Figure 1:
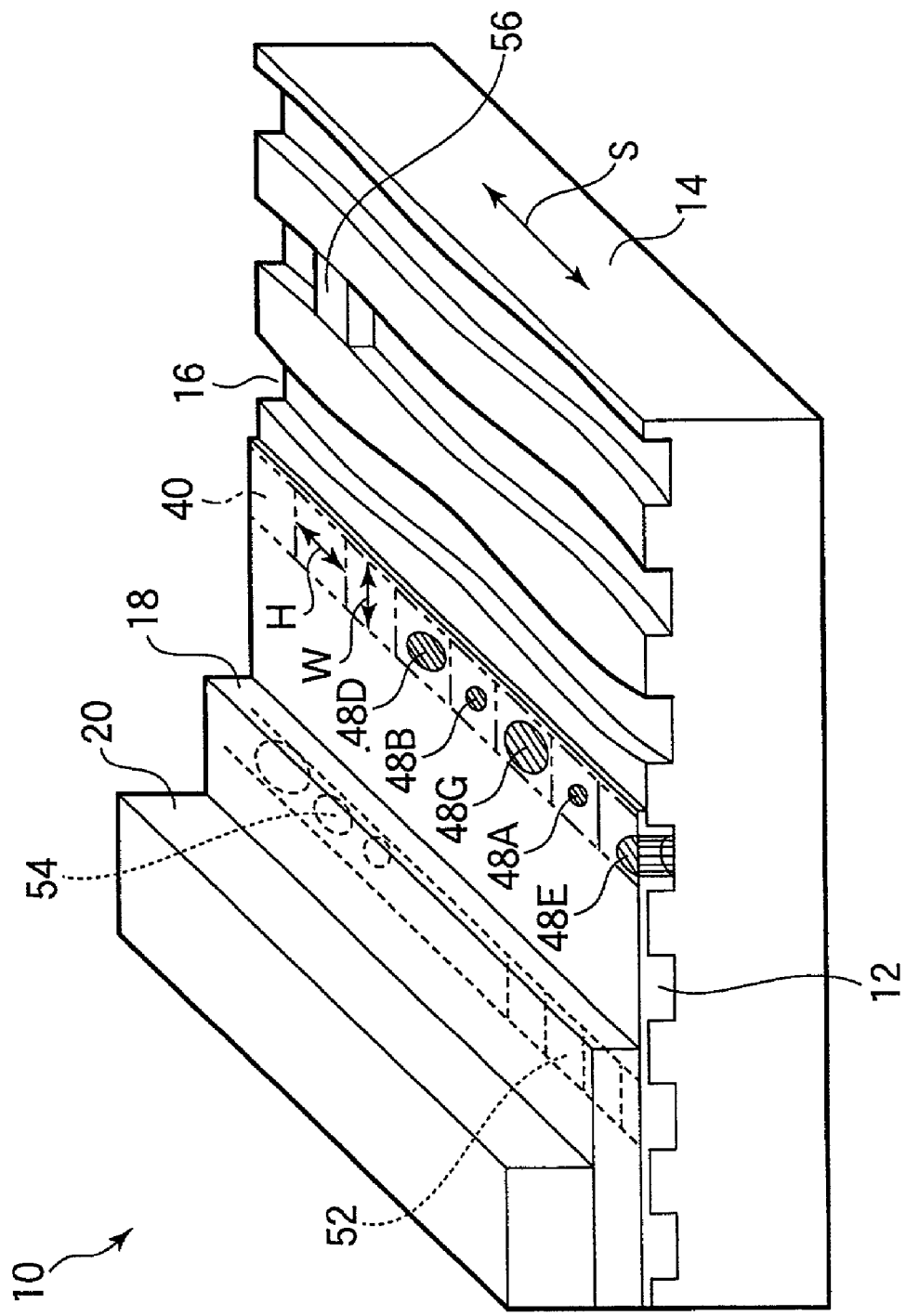
FIG. 1 is a partially sectional perspective view illustrating the main portion of an optical recording medium according to an embodiment of the present invention.

Now, embodiments of the present invention will be explained below in more detail with reference to the accompanying drawings.

An optical recording medium (disc) 10 to which an optical recording method according to an embodiment of the present invention is applied is a CD-R that employs a dye in recording layers 12 or a CD-RW that employs a phase changing material. For example, the CD-R is formed including a substrate 14 made of a transparent base material and the aforementioned recording layer 12 made of the dye applied to cover grooves 16, formed on one side of the substrate 14 (on the upper side in FIG. 1), for guiding a laser beam. The CD-R is formed also including a reflective film 18, such as of gold or silver, formed by sputtering or the like on the upper side of the recording layer 12, and a protective layer 20 for covering the outer side of the reflective film 18. For example, the CD-RW is formed including a lower protective layer (a dielectric layer) that is formed at least by depositing a film to cover the groove 16, a recording layer formed of a phase changing material, an upper protective layer (a dielectric layer), and an optical reflective layer, and further includes the protective layer 20 for covering those layers.

The dyes employed for the aforementioned recording layer 12 include organic dyes such as cyanine, mero-cyanine, methine-based dye and its derivatives, benzene thiol metal complex, phthalocyanine dye, naphthalo-cyanine dye, and azo dye. The phase changing materials generally include GeSbTe-based materials and AgInSbTe-based materials.

Figure 2:
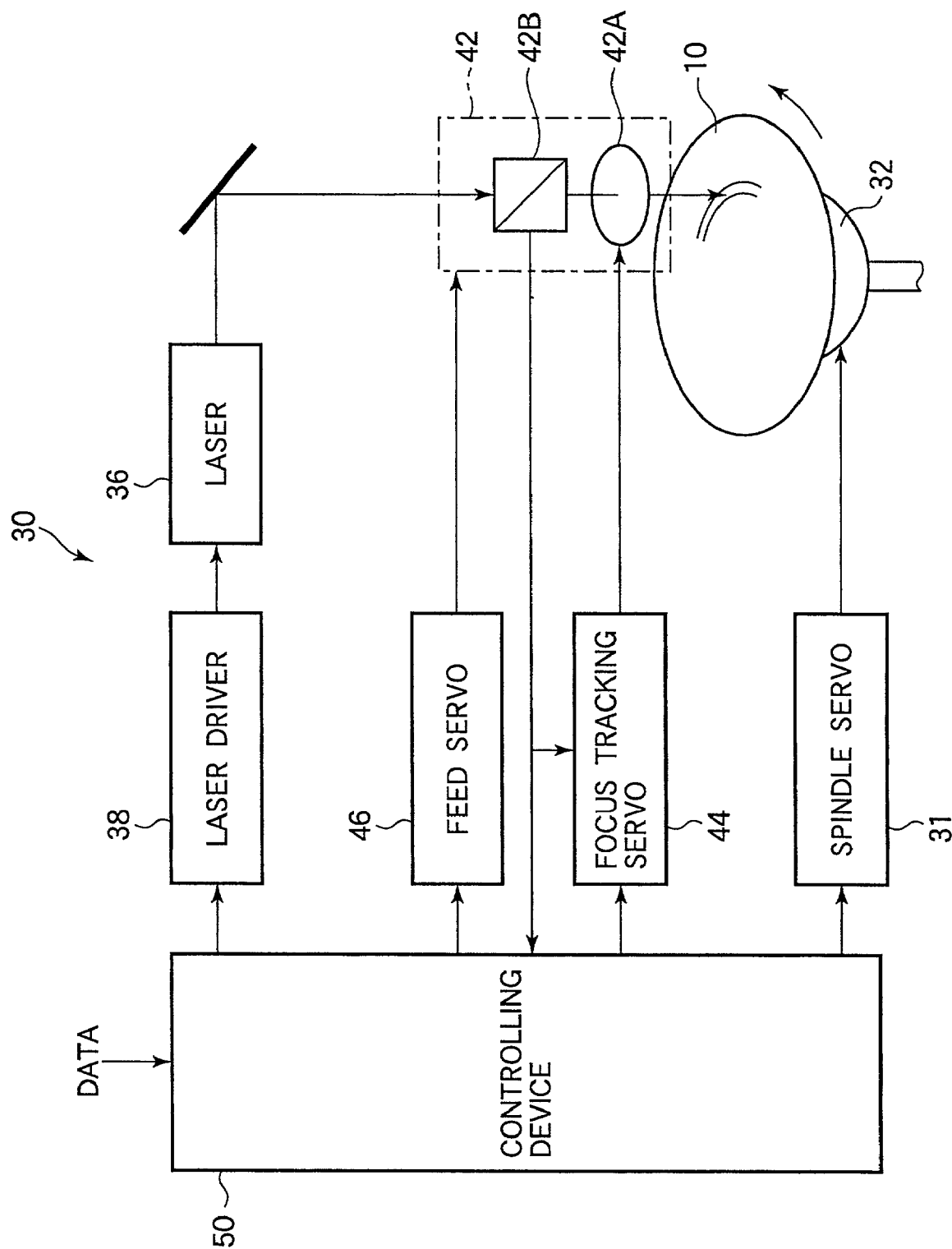
FIG. 2 is a block diagram illustrating an optical recording device for recording information onto the optical recording medium using a laser beam.

The multi-level recording onto the aforementioned optical recording medium 10 is performed by means of an optical recording device 30 shown in FIG. 2.

The optical recording device 30, a CD-R recorder, allows a spindle motor 32 to rotatably drive the optical recording medium (disc) 10 via a spindle servo 31 under a constant linear velocity in order to record information onto the optical recording medium (disc) 10 with a laser beam from a laser 36.

A laser driver 38 is adapted to control the aforementioned laser 36 in accordance with the information to be recorded. That is, the laser driver 38 controls the actual irradiating time of a laser beam incident on a virtual recording cell (described later) 40 shown in FIG. 1, for example, the number of laser pulses to be input to the laser 36.

Reference numeral 42 in FIG. 2 designates a recording optical system which includes an objective lens 42A and a half mirror 42B. The objective lens 42A is controlled by means of a focus tracking servo 44 in a manner such that a laser beam converges on the recording layer 12 of the disc 10. In addition, the objective lens 42A and the half mirror 42B are controlled by means of a feed servo 46 in phase with the rotation of the disc 10 to move from the inner to outer periphery at a predetermined velocity.

The spindle servo 31, the focus tracking servo 44, and the feed servo 46 are controlled by means of a controlling device 50. The data (information) to be recorded onto the recording layer 12 is input to the controlling device 50.

Figure 3:
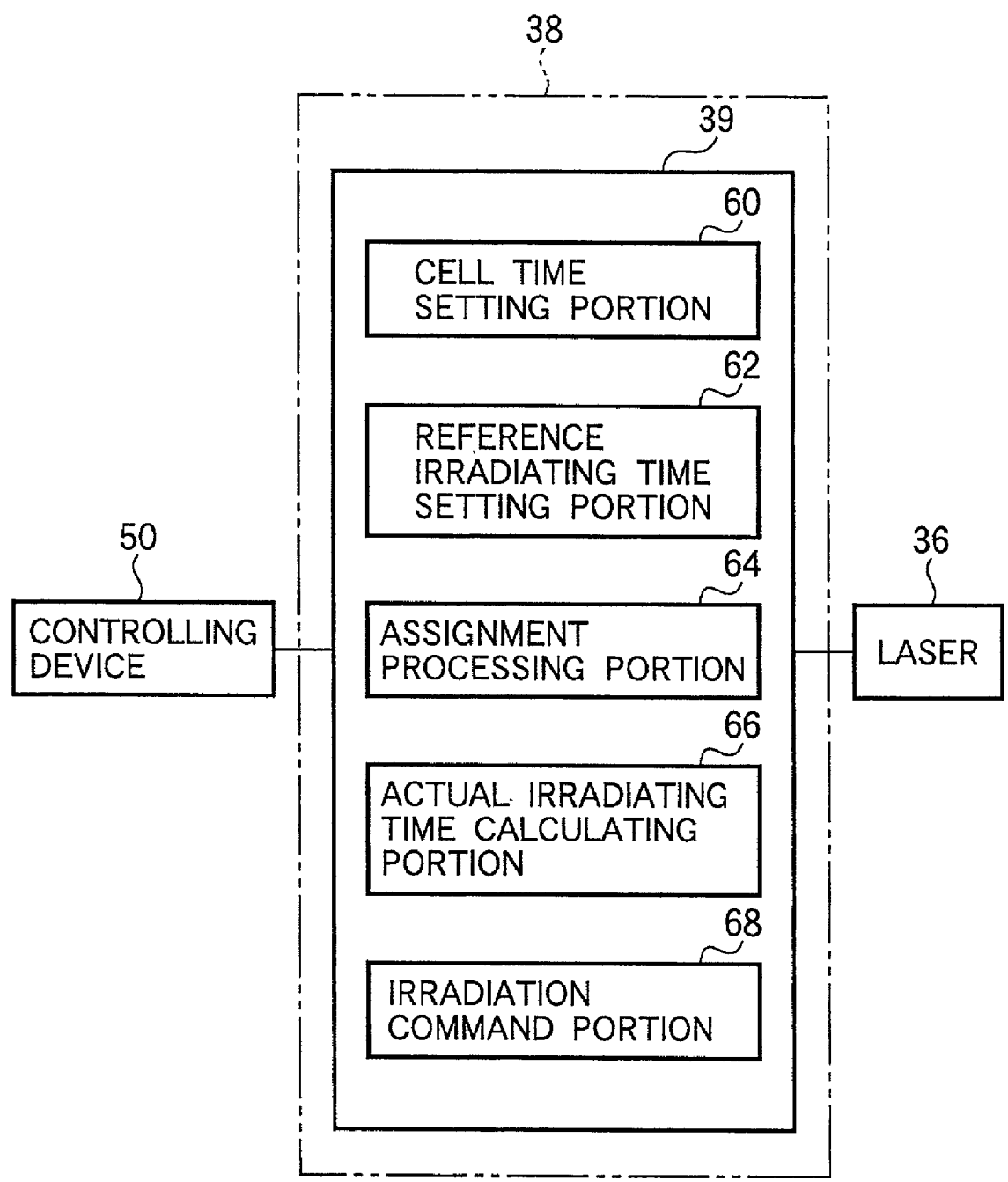
FIG. 3 is a block diagram illustrating the configuration of an irradiating time controlling device included in the optical recording device.

As shown in FIG. 3 in detail, the laser driver 38 includes an irradiating time controlling device 39. The irradiating time controlling device 39 has a cell time setting portion 60, a reference irradiating time setting portion 62, an assignment processing portion 64, an actual irradiating time calculating portion 66, and an irradiation command portion 68.

The cell time setting portion 60 defines contiguously predetermined cell times T (T1, T2, T3, T4, T5, T6 . . . ). Consequently, for example, letting v be the displacement velocity (linear velocity) of the optical recording medium 10 with respect to the laser 36, virtual recording cells 40 having length H of "v×T" are contiguously defined on the optical recording medium 10.

The reference irradiating time setting portion 62 defines five stages or more (seven stages of A to G in this case) of reference irradiating times tA, . . . , tG within the aforementioned cell times T. In this case, the reference irradiating times tA, . . . , tG may be recorded beforehand in a memory and read for definition. Alternatively, information on the reference irradiating times written on the optical recording medium 10 may be read for definition.

The assignment processing portion 64 modulates original information stored in the controlling device 50 and sets the resulting information to bit series for multi-level recording which is in turn assigned to each of the cell times T. Seven stages (A, B, C, D, E, F, and G) of recording marks are present here, and thus the bit series for multi-level recording is, for example, {B, E, D, C, G, G, . . . }. Each of these numerical values represent's the level of the recording marks formed in each of the recording cells 40. Accordingly, the aforementioned reference irradiating times t are assigned to each of the cell times T1, T2, . . . , as {tB, tE, tD, tC, tF, tG, . . . }, corresponding to each of the values of the aforementioned bit series.

Corresponding to the length of the reference irradiating time t assigned to a preceding cell time T, the actual irradiating time calculating portion 66 sets waiting time s of the subsequent neighboring cell time T, and then the reference irradiating time t assigned to the subsequent cell time T is subtracted by the waiting time s to determine actual irradiating time g.

For example, waiting times sA to sG are set here so as to correspond to all the reference irradiating times tA to tG. Consider the preceding cell time T1 in the aforementioned {tB, tE, tD, tC, tG, tG, . . . }. In this case, first, the waiting time sB corresponding to the reference irradiating time tB assigned thereto is selected, and the subsequent reference irradiating time tE is subtracted by the waiting time sB to determine the actual irradiating time g2 (=tE−sB)

Accordingly, the series of the actual irradiating time g, {g1, g2, g3, g4, g5, g6, . . . }, is given as {tB, tE-sB, tD-sE, tC-sD, tG-sC, tG-sG, . . . }.

The irradiation command portion 68 provides a timing, delayed by the aforementioned waiting time s in the cell time T, to a pulse for turning on the power, and outputs the aforementioned pulses over the aforementioned actual irradiating time g. Consequently, a predetermined laser beam is emitted from the laser 36 over the actual irradiating time g.

Figure 4:
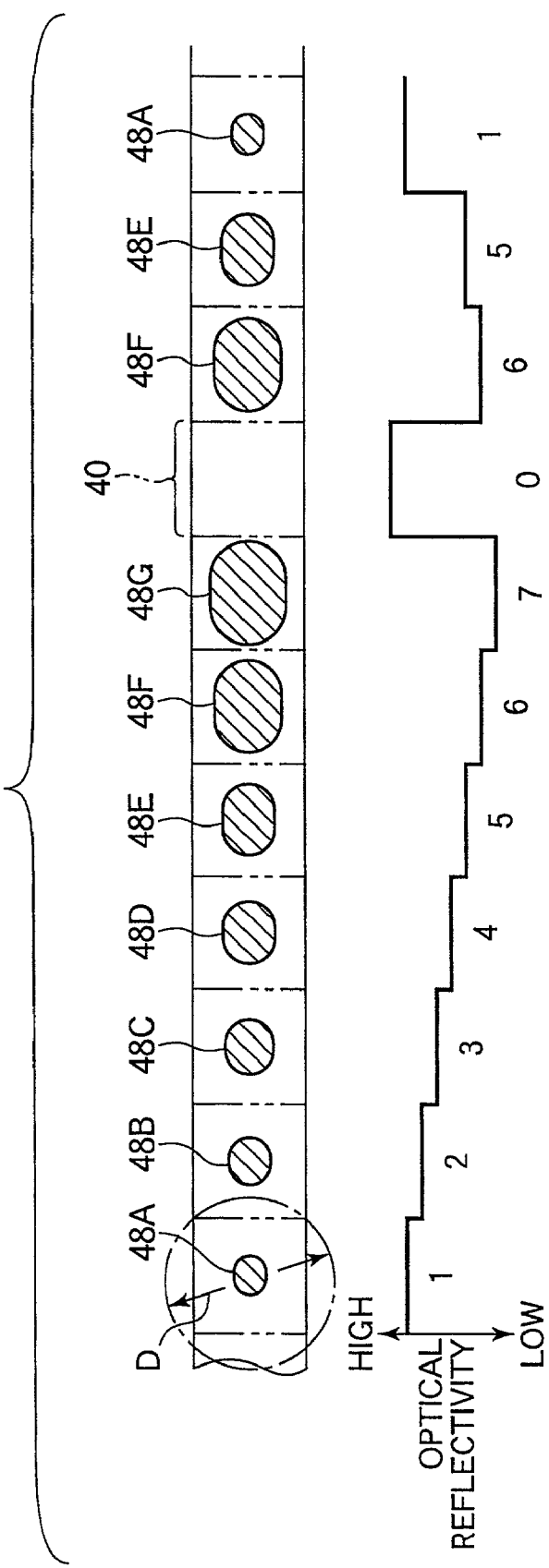
FIG. 4 is a schematic view illustrating the relationship among the recording mark, the virtual recording cell, and the optical reflectivity thereof, upon forming the recording mark on a recording layer by means of the optical recording device.

As shown in FIG. 1, in the optical recording medium 10, the virtual recording cells 40 are contiguously defined in the direction of rotation of a disc 34, or in the circumferential direction S, in the aforementioned groove 16. The unit length of each of the virtual recording cells 40 in the circumferential direction S is given by H, which is set to a length shorter than beam diameter (the diameter of the beam waist) D, as shown in FIG. 4. Furthermore, the unit width is given by W in the direction orthogonal to the aforementioned unit length H(=v×T). Each of the virtual recording cells 40 is irradiated with a laser beam to form recording marks 48A to 48G, schematically exemplified, in accordance with the information to be recorded.

More specifically, the recording marks 48A to 48G are formed through the following steps.

First, use is made of a test recording region (not shown) prepared in the innermost circumference of the optical recording medium 10. The waiting time s is thereby tentatively set to zero to form a plurality of recording marks 48A to 48G of each level, and the recording marks 48A to 48G are read to thereby determine the presence or absence of the effect of heat. This determination is based on the magnitude of a deviation from an ideal read-out waveform that each of the recording marks 48A to 48G is supposed to have. When the amount of the deviation is less than a predetermined tolerance, it is determined that the aforementioned waiting time s is too small, and the waiting time s is gradually increased to conduct recording tests repeatedly. When the deviation has reached the tolerance, the predetermined waiting time s at that time is given as the waiting time to be employed for actual recording. In consideration of the amount of heat stored in the preceding recording mark, this means that the waiting time upon forming the subsequent recording mark is determined.

As an example, suppose that the recording mark 48G of a maximum level (the longest irradiating time) is contiguously recorded in the test recording region. The test recording region is irradiated with a laser beam to form a recording mark 47G in accordance with the reference irradiating time tG with zero waiting time. Then, the read-out waveform of the recording mark 48G is deviated from the ideal waveform, the waiting time is increased to conduct the recording test again. This is repeated several times to define the waiting time, at which the tolerance is reached, as the waiting time sG, which will not allow the heat stored in the preceding recording mark 48G (level 7) to affect the subsequent recording mark.

This test phase is carried out every time a new optical recording medium 10 is inserted into the optical recording device 30. This is because the property of the optical recording medium 10, the ambient temperature, or the like varies the aforementioned waiting time s.

Upon recording actual information onto the optical recording medium 10, the virtual recording cells 40 are contiguously defined, as already described, by setting cell time T. Then, the reference irradiating times tA to tG of a laser beam are set for the virtual recording cells 40.

Figure 5:
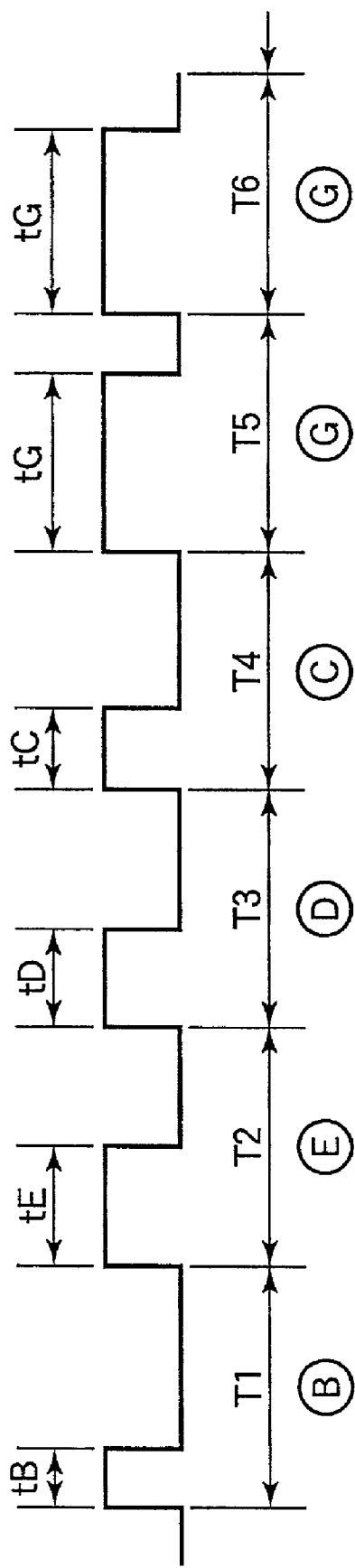
FIG. 5 is a diagram illustrating the process of generating a timing chart for the irradiation of a laser beam upon forming the recording mark on a recording layer by means of the optical recording device.

Consequently, as shown in the time chart of FIG. 5, the reference irradiating times {tB, tE, tD, tC, tG, tG, . . . } are assigned to each of the cell times T1, T2, T3, . . . , corresponding to the bit series {B, E, D, C, G, G, . . . } obtained by modulating the original information. Incidentally, such a case is shown here in which the reference irradiating time t is set from the head of each cell time T (i.e., head reference). However, such cases may occur in which the reference irradiating time is set to the center of each cell time T (intermediate reference) or the reference irradiating time is set with the tail of each cell time T being employed as a reference (tail reference).

Then, in consideration of the amount of heat stored by irradiating the preceding virtual recording cell 40 with a laser beam, a predetermined waiting time is defined for the subsequent virtual recording cell 40. More specifically, it is assumed that when the reference irradiating time is given by tA which is assigned to the preceding virtual recording cell 40, the waiting time is given by sA which is set at the subsequent virtual recording cell 40. Likewise, it is assumed that when the reference irradiating time is given by tC which is assigned to the preceding virtual recording cell 40, the waiting time is given by sC which is set at the subsequent virtual recording cell 40.

Figure 6:
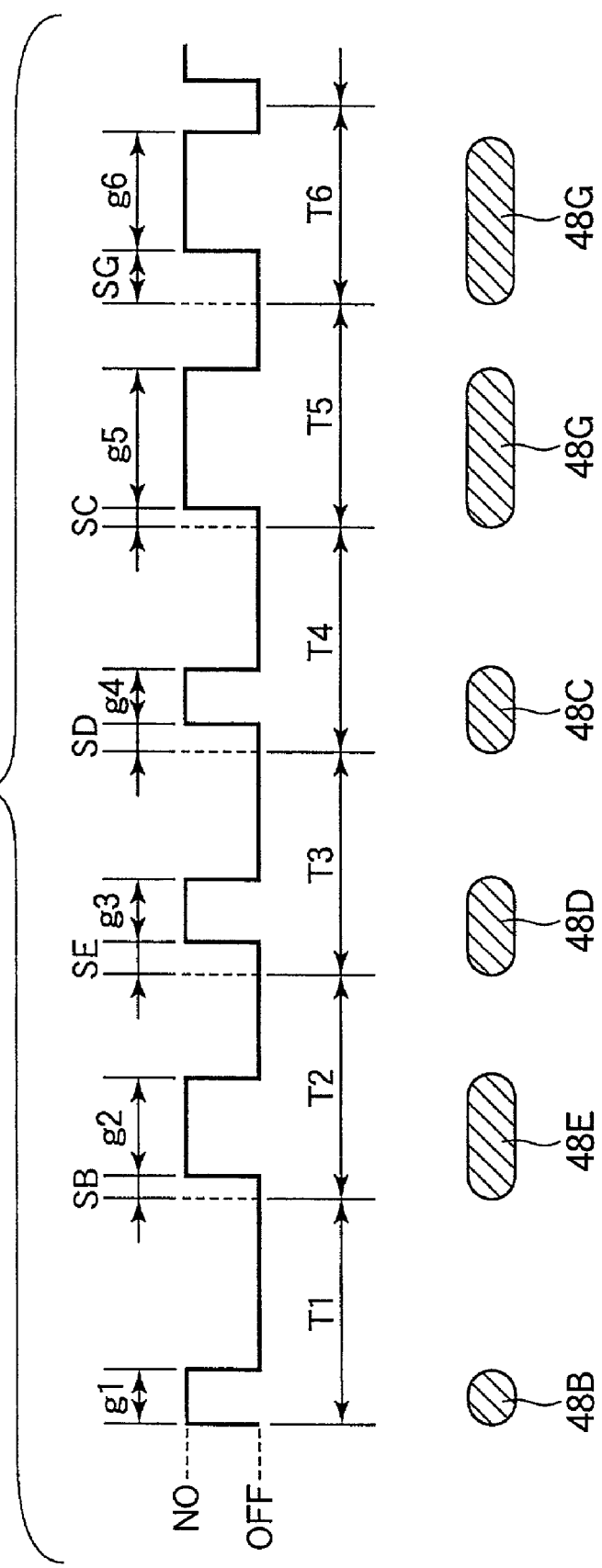
FIG. 6 is a view illustrating a final timing chart for the irradiation of a laser beam upon forming the recording mark on a recording layer by means of the optical recording device.

Furthermore, use is made of the waiting time s that has been set as described above. Thus, the reference irradiating times {tB, tE, tD, tC, tG, tG, . . . }, assigned to each of the virtual recording cells 40, are subtracted by the waiting times {0, sB, sE, sD, sC, sG, . . . } to set the actual irradiating times {g1, g2, g3, g4, g5, g6}={tB-0, tE-sB, tD-sE, tC-sD, tG-sC, tG-sG, . . . }. In addition, the due irradiation initiation is delayed in timing by the waiting times waiting times {0, sB, sE, sD, sC, sG, . . . }, thereby yielding the time chart as shown in FIG. 6. Irradiation of laser beams in accordance with this time chart would make it possible to form the recording marks 48A to 48G with accuracy. It is also made possible to set each of the virtual recording cells 40 to an optical reflectivity as desired.

Incidentally, the recording marks 48A to 48G are formed not on the entire area of the beam spot of the laser beam but at the center portion thereof. (Although the laser beam is circular in shape, the disc 10 is irradiated with the laser beam while being rotated, thereby making the recording mark elliptical in accordance with the time of irradiation.)

This is because of the following reason. A focused laser beam forms in general a Gaussian distribution. However, in the recording layer 12, only the portion of a laser beam having an irradiation energy exceeding a certain threshold value carries out recording and thereby the recording marks 48A to 48G are formed so as to expand outwardly from the center.

As shown in FIG. 4, for example, this makes it possible to form the recording marks 48A to 48G of seven stages having different occupation ratios to the virtual recording cells 40.

In this case, the size of each of the recording marks 48A to 48G is set such that seven stages of optical reflectivity are given to the reflected beams when the virtual recording cells 40 are irradiated with a read-out laser beam. The aforementioned optical reflectivity increases in magnitude as the recording marks decrease. Thus, the optical reflectivity takes on the maximum reflectivity in the virtual recording cells where no recording marks are formed, while the optical reflectivity takes on the minimum reflectivity in the virtual recording cells where the maximum recording mark 48G is formed. Describing in more detail, the aforementioned optical reflectivity is conceivably determined by the occupation ratio to the virtual recording cell 40 including the optical transmittance of each of the recording marks 48A to 48G.

Incidentally, the optical transmittance of the recording marks 48A to 48G themselves depends on the material forming the recording layer 12, which is irradiated with a laser beam to be decomposed and changed in quality and refractive index thereof, and the amount of change in thickness of the recording layer 12. If the recording mark portion formed has zero optical transmittance, this has not to be taken into account and only the aforementioned occupation ratio is followed.

According to the recording method of the aforementioned embodiment, the irradiating time is controlled and thereby a multi-level recording of five stages or more can be accomplished. Furthermore, in consideration of the amount of heat stored in the preceding recording marks 48A to 48G, the waiting time s is ensured for the subsequent virtual recording cell 40. The aforementioned amount of heat stored in the preceding recording marks 48A to 48G is assigned to the lacking amount of heat corresponding to the waiting time s. Consequently, it is made possible to obtain the recording marks 48A to 48G as expected and the optical reflectivity (of the virtual recording cells 40) as expected.

The deviation (shift) in optical reflectivity, prevented as such, makes it possible to reduce the stage width of each level and thereby increase the total number of levels (seven stages of A to G here), and thus the recording density of the optical recording medium can be increased.

Furthermore, use is made of the test region of the optical recording medium 10 that rotates at an actual write velocity to set the aforementioned waiting time s by actual measurement. Accordingly, this makes it possible to take the circumstances upon recording (such as the ambient temperature, the recording velocity, and data transfer rate) and thereby perform recording with less error. Incidentally, in this embodiment, such a setting method has been shown which makes use of the test region; however, the waiting time that has been set in advance as a fixed value may be used. At this time, however, it is preferable to set a longer waiting time upon performing recording on the subsequent virtual recording cell 40 as the preceding virtual recording cell 40 is irradiated for a longer period of time. Consequently, this makes it possible to provide good signal properties upon reading.

Further, in the aforementioned embodiment, it is possible enough to read the recording marks (all recording marks 48A to 48G, here) even their length is shorter than diameter D of the focused laser beam of the reading laser beam, as shown in FIG. 4. Consequently, it is possible to increase the recording density to one unit square than in the prior art.

Incidentally, in this embodiment, all of the recording marks are smaller than the diameter D of the focused laser beam. However, the present invention is not limited thereto and can be applied to other cases in that one or more (not all) recording marks are smaller than the diameter D or all of the recording marks are larger the diameter D of the focused laser beam.

In addition, such a case has been shown in which the aforementioned optical recording device 30 allows the irradiating time controlling device 39 to control the ON and OFF timing of the power of the laser 36. However, it is eventually sufficient if the present invention can control the "irradiation" of the laser beam. Thus, for example, it may also be preferable to control the irradiation timing by opening or closing a shutter for interrupting a beam of light.

Now, another embodiment of the present invention will be explained below in which the aforementioned laser driver 38 is replaced by a laser driver 78 of another configuration shown in FIG. 7.

The laser driver 78 can set the irradiation power of laser beam to at least three stages such as cooling power C, waiting power T, and recording power K. The setting is provided here such that C<T<K. Incidentally, irradiation of laser beams at the aforementioned recording power K allows the recording marks 48A to 48G to be actually formed in the virtual recording cells 40.

Figure 7:
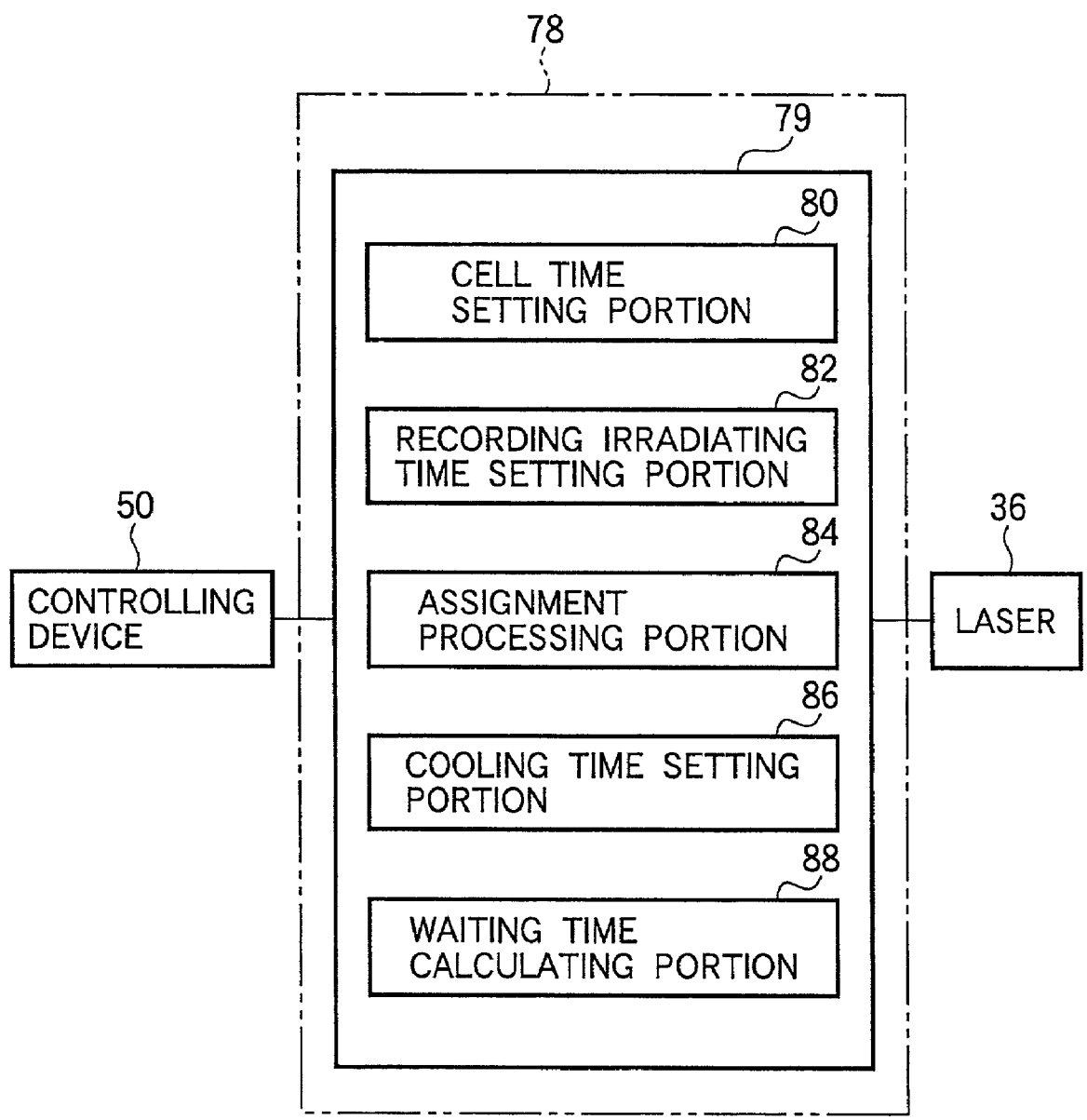
FIG. 7 is a block diagram illustrating the laser controlling system of an embodiment in which the laser driver is replaced with another laser driver in the optical recording device.

As shown in detail in FIG. 7, the laser driver 78 includes an irradiation command device 79. The irradiation command device 79 comprises a cell time setting portion 80, a recording irradiating time setting portion 82, an assignment processing portion 84, a cooling time setting portion 86, and a waiting time calculating portion 88.

The cell time setting portion 80, the recording irradiating time setting portion 82, and the assignment processing portion 84 have the same configuration and action as those of the aforementioned cell time setting portion 60, the reference irradiating time setting portion 62, and the assignment processing portion 64.

The cooling time setting portion 86 defines a predetermined cooling time R immediately after the recording irradiating time tA to tG assigned to each of the virtual recording cells 40. It may be allowed to read the cooling time R which is stored in advance either in the memory provided for the laser driver 78 or in the optical recording medium 10.

The waiting time calculating portion 88 sets waiting time g between the completion of each cooling time R and the initiation of the recording irradiating times tA to tG in the subsequent virtual recording cell 40.

In this embodiment, the recording irradiating times tA to tG of a laser beam are set like the previous embodiment, and the recording irradiating times {tB, tE, tD, tC, tG, tG, ... } are assigned to each cell times T1, T2, T3, ..., corresponding to the bit series {B, E, D, C, G, G, ... } obtained by modulating original information.

Then, a predetermined cooling time R is defined and added contiguously after each recording irradiating time t.

Furthermore, waiting time g is set to all the vacant times except the recording irradiating time t and the cooling time R.

That is, the waiting times {g1, g2, g3, g4, g5, g6, ... } in this embodiment result in the cell times {T1, T1, T3, T4, T5, T6, ... } subtracted by the recording irradiating times {tB, tE, tD, tC, tG, tG} and the cooling times {R, R, R, R, R, R}, respectively, thus yielding {T−(tB+R), T−(tE+R), T−(tD+R), T−(tC+R), T−(tG+R), T−(tG+R)}. Eventually, the longer the recording irradiating times tA to tG, the shorter the waiting time g is set.

Figure 8:
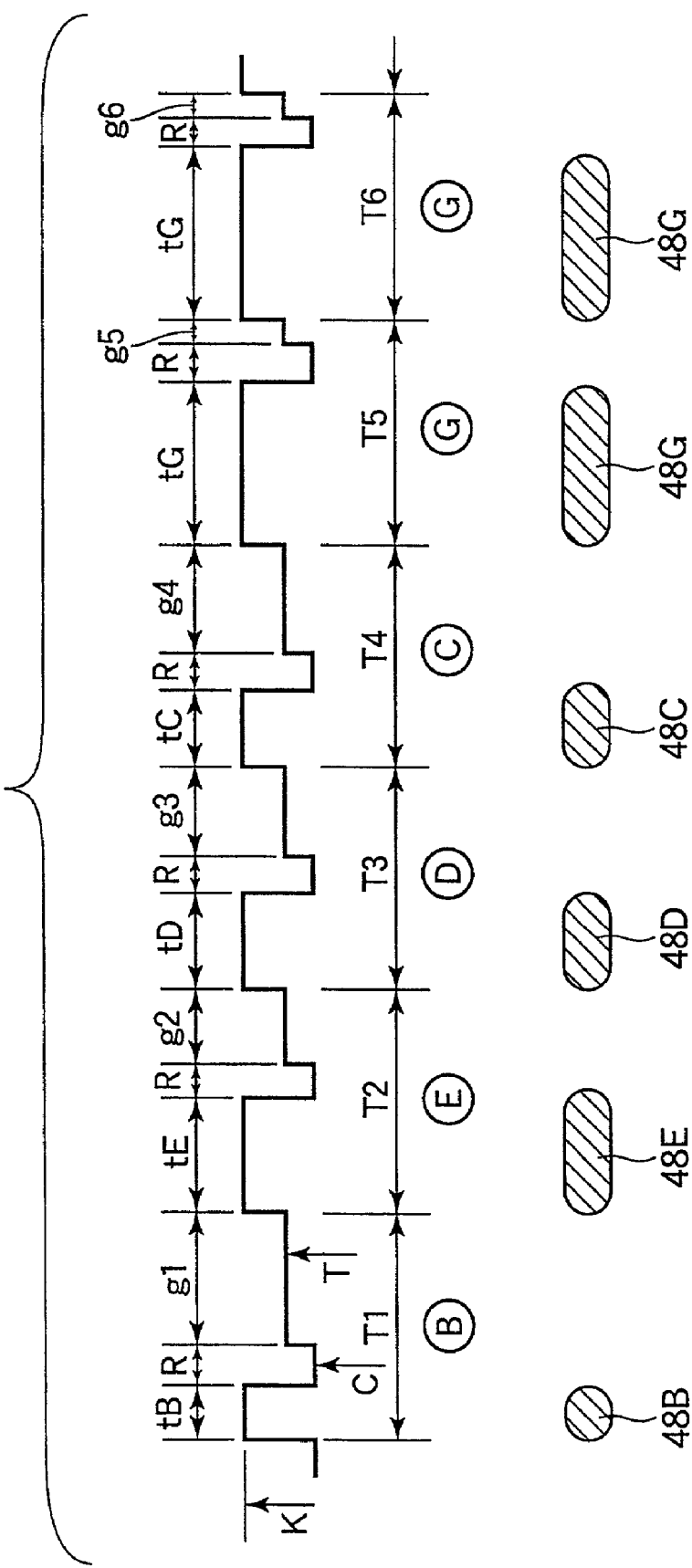
FIG. 8 is a view illustrating a final timing chart for the irradiation of a laser beam upon forming the recording mark on a recording layer by means of the optical recording device with said another laser driver.

Consequently, it is possible to obtain the time chart shown in FIG. 8. In accordance with this time chart, during the recording irradiating time t, the virtual recording cells 40 are irradiated with a laser beam at the recording power K to actually form the recording marks 48A to 48G. During the cooling time R, the virtual recording cells 40 are irradiated with a laser beam at the cooling power C, and during the waiting time g, the virtual recording cells 40 are irradiated with a laser beam at the waiting power T. This makes it possible to set each of the virtual recording cells 40 to optical reflectivity as desired.

The recording method according to the aforementioned embodiment accomplishes multi-level recording of five stages or more by controlling the recording irradiating time. Furthermore, the cooling time R for irradiation of a laser beam at the cooling power C is provided immediately after each of the recording irradiating times tA to tG assigned. This makes it possible to reduce immediately the amount of heat delivered to each of the virtual recording cells 40, thereby allowing the optical reflectivity to converge to a desired value. This in turn means that it is possible to reduce the deviation of the actual optical reflectivity from the target optical reflectivity of each level.

In addition, it is possible to prevent an extreme drop in temperature of the laser 36 due to the irradiation of a laser beam at the waiting power T greater than the cooling power C during the waiting time g after the predetermined cooling time R has elapsed. Consequently, the power of the laser beam rises quickly at the initiation of irradiation of the subsequent recording irradiating times tA to tG, thereby allowing the recording power K to be attained immediately.

From the foregoing viewpoint, the cooling time R may be terminated when the laser 36 has reached the predetermined temperature threshold value or less, and thereafter the temperature thereof may be maintained by the waiting power T. Accordingly, at the test region prepared beforehand on the inner circumference of the optical recording medium 10, the cooling time R may be variably set to repeat the recording test. Thus, the cooling time that provides a good optical reflectivity may be set each time before actual information is recorded.

Incidentally, such a case has been shown here in which the cooling time R and waiting time g are set after the irradiating times tA to tG at each stage. However, the consideration that the cell time T becomes shorter as the recording density is improved may lead to a situation in which at least the longest recording irradiating time tG and the cooling time R would occupy the cell time T. In this case, the waiting time g can be set to zero.

As described above, the deviation (shift) in the optical reflectivity is prevented. This makes it possible to reduce the level stage width and thereby increase the total number of levels (seven stages of A to G here), thus making it possible to increase the recording density of the optical recording medium.

On the other hand, in the example of this embodiment, such a case has been explained in which the recording layer 12 of the optical recording medium 10 is mainly formed of an organic dye material to function as a CD-R. However, suppose that an optical recording medium of a CD-RW type is used in which a phase changing recording layer is employed as the recording layer. In this case, for example, the recording layer may be irradiated with a laser beam at the recording power K to change into an amorphous state. Then, irradiation at the cooling power C may not be allowed to cause any change in the recording layer. Moreover, it may be so set that the recording layer is irradiated with a laser beam at the waiting power T to be changed into a crystalline state. This will make it possible to conduct additional multi-level recording of information with the aforementioned advantage being still available. As a matter of course, the present invention may also be applied to an optical recording medium other than the CD-R/RW.

The aforementioned embodiments have shown the optical recording medium 10 formed as a disc acting as a CD-R as described above. However, the present invention is not limited thereto and to a disc-shaped rotating body but can be applied in general to other optical recording media.

In the example of each of the aforementioned embodiments, the recording layer 12 is formed of an organic dye such as cyanine, however, the present invention is not limited thereto. The recording layer 12 may be formed of an organic dye other than those described above or of inorganic materials, and moreover of other materials as appropriate. However, use of the aforementioned organic dye ensured it to vary the size of the recording mark for recording, corresponding to the irradiating time of five stages or more of laser beams, thus making it possible to provide reading with an extremely high accuracy.

Still furthermore, the size of the virtual recording cells 40 that are set on the recording layer 12 upon forming recording marks by the aforementioned optical recording device 30 is not limited to the example of the embodiments. In particular, if the waist diameter of a laser beam can be further reduced, the length of the virtual recording cells 40 is most preferably made equal to the width of the groove 16. On the other hand, when the recording marks are recorded in a greater multi-stage manner such as in eight stages, the length may be set to the laser beam waist or greater. In this case, it is possible to make part of the recording marks in size greater than or equal to the beam waist. As a matter of course, the present invention can be applied to a disc having a DVD structure and to an optical recording medium having no groove 16 as well.

Figure 9:
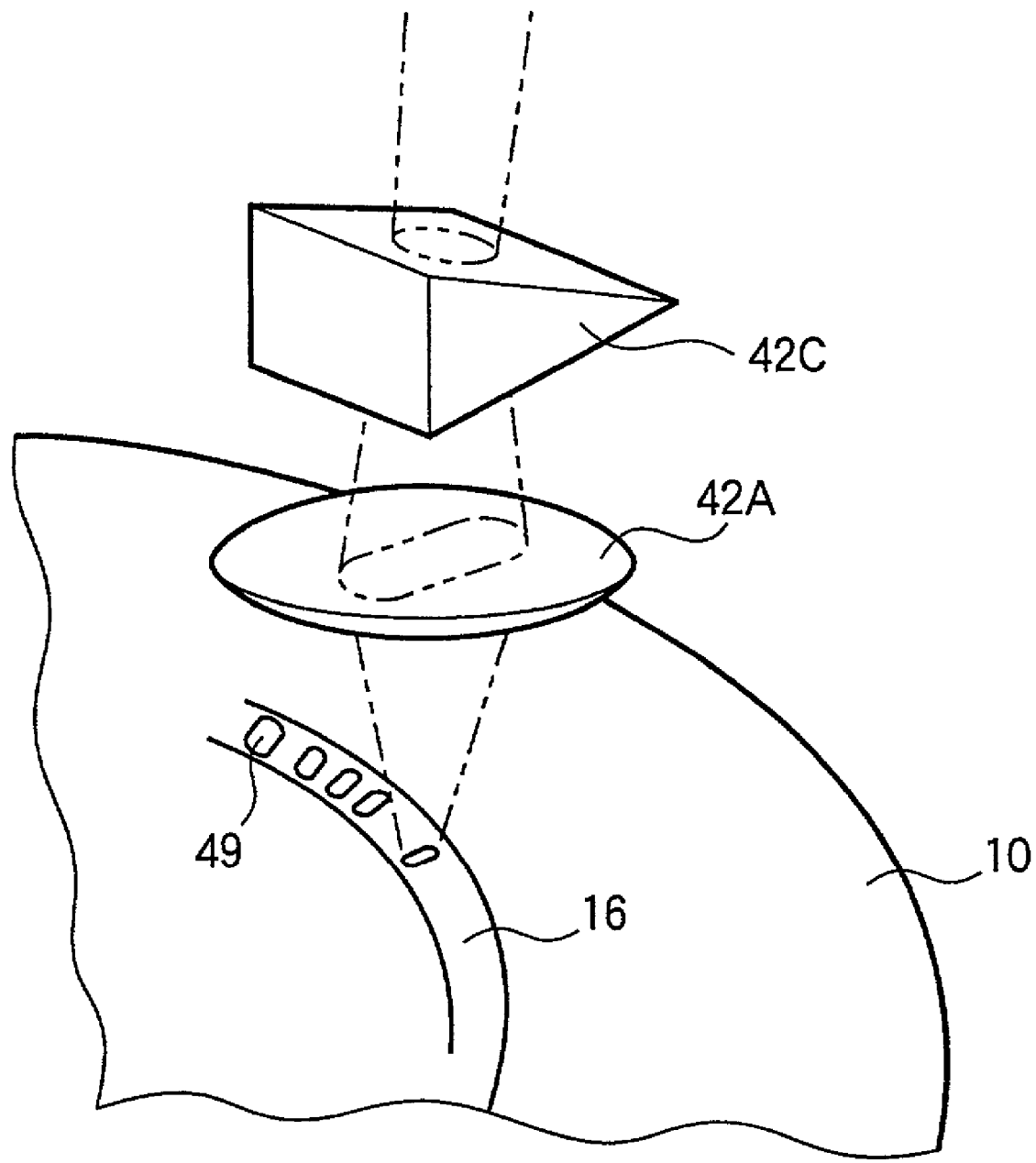
FIG. 9 is a schematic perspective view illustrating a case in which virtual recording cells are irradiated with a laser beam of another shape.

In addition, the aforementioned laser beam is made circular in size on a position of the recording layer 12. However, as shown in FIG. 9, for example, a beam shaping prism 42C or an aperture (not shown) may be added to the objective lens 42A, thereby making the beam shape elliptical and short in the direction of feed of the optical recording medium 10 and long in the direction orthogonal thereto or linear. In this case, since the recording mark 49 becomes shorter, the virtual recording cell can be further made shorter. That is, the recording density can be improved.

Furthermore, as shown by the reference numeral 52 in FIG. 1, the optical recording medium 10 may be designed to have a plurality of pits having different reflectivity and adapted in number to the stages for signal modulation. Alternatively, the multi-level recording according to the optical recording method of the present invention may be performed beforehand on part of the optical recording medium. On these plurality of pits 52 and/or the recording marks 54 on which the multi-level recording has been performed, it may be allowed to write information for individually identifying the recording medium and information for identifying the recording medium as an optical recording medium for multi-level recording. It may also be allowed to write information for determining the reference irradiating time of a laser beam for reading and writing on the recording medium and particular information such as information for determining the waiting time. The particular information is read upon reading and/or recording on the optical recording medium to thereby positively identify the optical recording medium as one for multi-level recording. It is further possible to individually identify the optical recording medium and provide more positive multi-level recording and reading.

Normally, a recording medium for a CD-RW and a DVD-R/RW records a signal by wobbling a recording groove. This signal is referred to as an address signal. To read this signal enables a recording device to move a recording head to a predetermined position.

For example, in the case of a CD-R/RW, a time code of a minute and a second, whereby a position is replaced with a time, is recorded in this address signal. The recording device reads this time code and moves the head to a read-in portion, so that the recording device becomes possible to read various data.

A multi-level optical recording medium according to the present invention is capable of adopting an address signal by wobbling in the case that this multi-level optical recording medium is used (i.e., recorded or reproduced) in a recording device to be applied to a CD-R/RW. However, in this case, a signal system such as an address code or the like, which is different from a normal time code of a CD-R/RW, is adopted. A normal recording device is not capable of reading a peculiar address signal, which is different from that of the CD-R/RW, and is not capable of moving a head to a predetermined position (in this case, the multi-level optical recording medium is discharged from the recording device).

On the other hand, a recording device in association with multi-level recording becomes possible to read a signal by moving the head to the read-in portion, if the peculiar address is set to be capable of being identified.

In other words, it is possible to distinguish a multi-level optical recording medium from other optical recording medium by adopting an address, which is different from a normal address.

For example, as shown in FIG. 9, the recording by the use of the above described wobble is performed by modulating the wobble in grooves 104A to 104C in a read-in area 102 of an optical recording medium 10.

Figure 10:
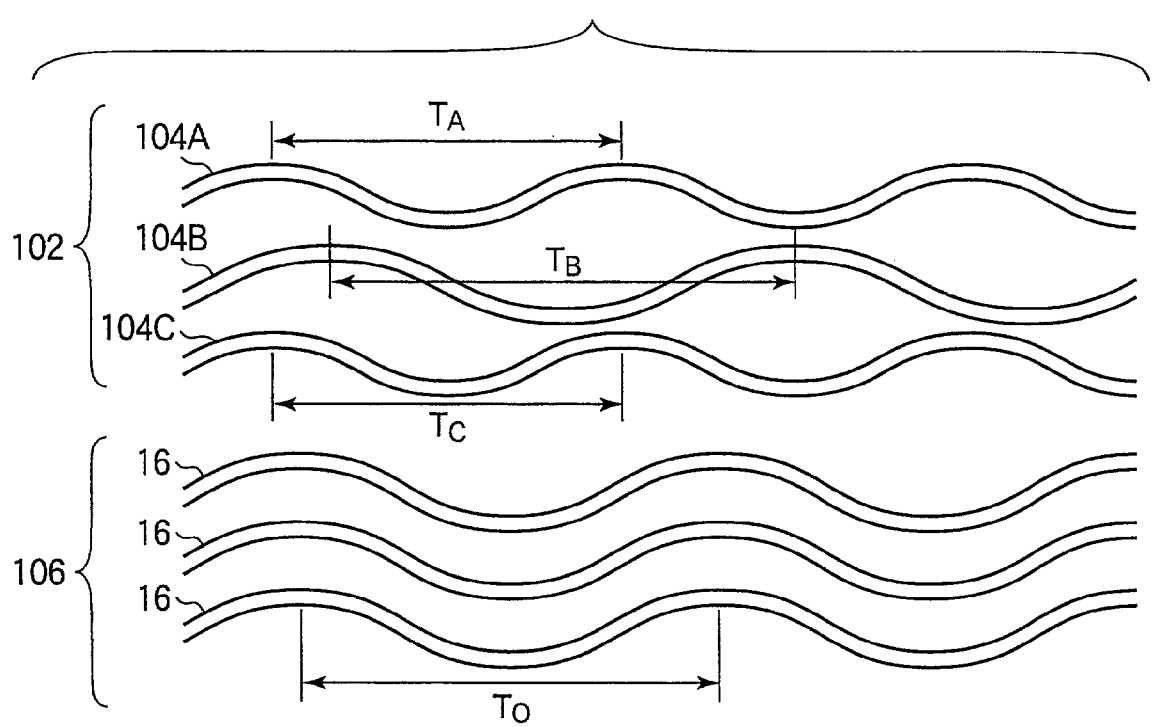
FIG. 10 is an enlarged schematic view illustrating the wobble on which various information are recorded on the optical recording medium of the present invention.

Specifically, as shown in FIG. 10, without changing amplitude Wb of the wobble, wobble frequencies $T_A$, $T_B$ and $T_C$ of respective grooves are changed. For example, a wobble frequency $T_o$ of a groove 16 in a user area 106 shown in FIG. 10 is defined as a reference frequency and a wobble frequency $T_B$, which is longer than this reference frequency $T_0$, is mounted on a two-level signal indicating "1" and wobble frequencies $T_A$ and $T_C$, which are shorter than the reference frequency $T_0$, are mounted on a two-level signal indicating "0", so that the above described various information are recorded. Accordingly, for example, when the wobble frequencies are defined as "0", "1" and "0" counted from the inner periphery of the optical recording medium, it is indicated that this optical recording medium 10 is set to be used for the multi-level recording.

Alternatively, the above described predetermined information is defined as recording start position information and then, on the basis of this information, the recording of the information is set to be started from a predetermined position of the user area 106. This information also becomes the information of a starting position of a virtual recording cell 40.

Figure 11:
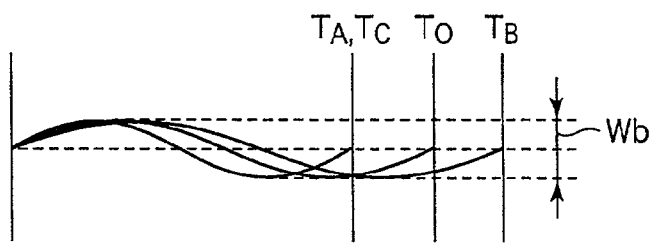
FIG. 11 is a diagram illustrating the relationship between wobble frequencies of the wobble and binary information.

Alternatively, according to other example of a recording method of the above described various information as shown in FIG. 11, the above described various information are mounted on a land pre-pit 17A, which has been formed in a land 17 between respective grooves 16, and then, for example, in the case that a frequency between the land pre-pits is short, the optical recording medium 10 binary records the information as "1" and in the case that a frequency between the land pre-pits is long, the optical recording medium 10 binary records the information as "0".

Figure 12:
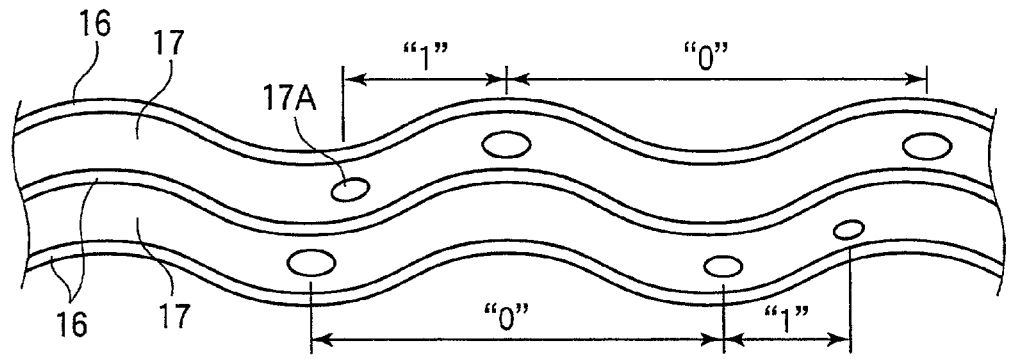
FIG. 12 is a schematic view illustrating the relationship between a binary information and a land pre-pit on which various information are recorded on the optical recording medium of the present invention.

Further, according to other example as shown in FIG. 12, the grooves 16 are ceased and then, for example, in the case that a ceased length of the groove is short, the optical recording medium 10 is controlled to indicate "1" and for example, in the case that it is long, the optical recording medium 10 is controlled to indicate "0".

By enabling the information recorded by the information recording means shown in the above described FIGS. 9, 11 and 12 also to be capable of being read by even a reading device of a conventional binary recording type, even if this multi-level optical recording medium is loaded in a reading and/or recording device of a binary recording type by mistake, this multi-level optical recording medium is easily identified as a multi-level type recording medium.

Figure 13:
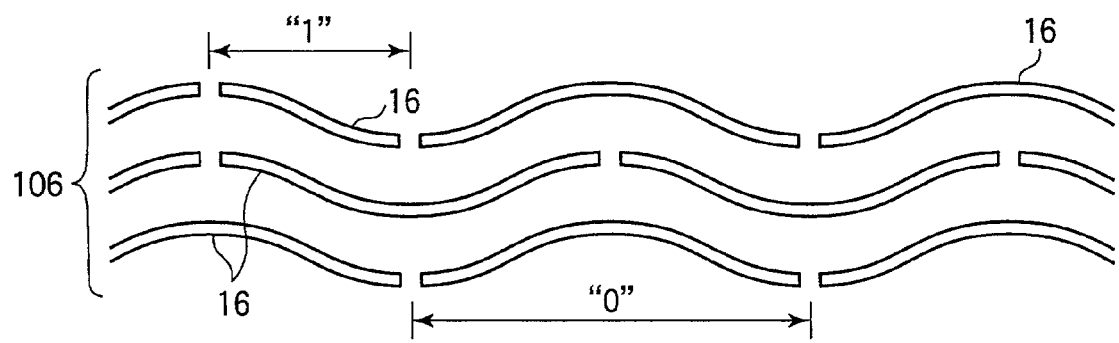
FIG. 13 is a schematic view illustrating the relationship between a binary information and a ceased length of the groove on which various information are recorded on the optical recording medium of the present invention.
Figure 14:
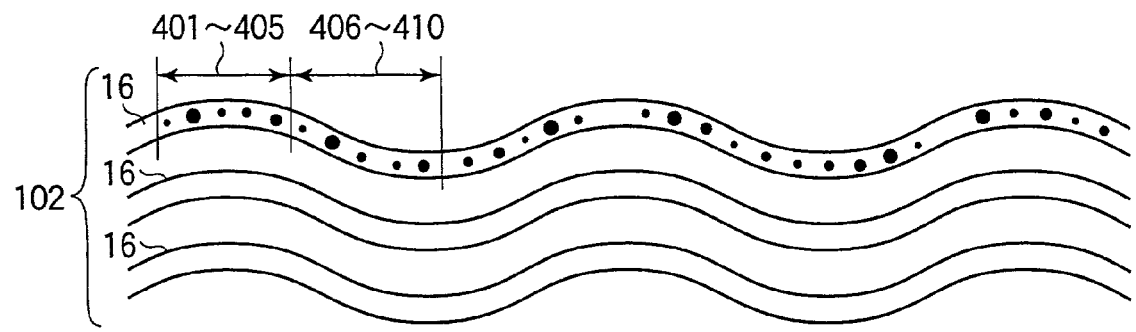
FIG. 14 is a schematic view illustrating the virtual recording cells and the recording marks on which various information are recorded on the optical recording medium of the present invention.

Further, for example, as shown in FIG. 13, it is possible to multi-level record the above described various information in the read-in area 102 in advance. In this case, in FIG. 13, it is possible to record the fact that this recording medium is a multi-level recording medium and the number of the stages of the multi-level recording by means of first five recording marks of virtual recording cells 401 to 405 and it is possible to record a recommended laser power for recording or reading or the like by means of next five virtual recording cells 406 to 410, respectively. These methods can be used alone or by combination.

According to the optical recording method and the optical recording medium of the present invention, it is made possible to perform multi-level recording in accordance with data made available for recording, and moreover provide a good property for the read-out signal from the recording marks.

What is claimed is:

1. An optical recording method for irradiating an optical recording medium having a recording layer on an optically transparent substrate with a laser beam to form a recording mark, comprising the steps of:
    defining contiguously, on said recording layer, a virtual recording cell having a given unit length in a displacement direction relative to that of said laser beam and having a given unit width in a direction orthogonal thereto, along said displacement direction,
    setting reference irradiating time of said virtual recording cell with said laser beam to five stages or more,
    irradiating with a laser beam of zero power or weak enough not to form a recording mark after irradiating with said laser beam for recording on a preceding virtual recording cell, and irradiating with a laser beam of zero power or weak enough not to form a recording mark before irradiating with a laser beam for recording on a neighboring subsequent virtual recording cell, and
    forming at least five types of recording marks having different sizes on said plurality of virtual recording cells to perform multi-level recording of information by modulating an optical reflectivity based on an area ratio to said virtual recording cell.

2. The optical recording method according to claim 1, further comprising the steps of:
    defining a predetermined waiting time for said neighboring subsequent virtual recording cell,
    corresponding to the length of said reference irradiating time for said preceding virtual recording cell, and
    setting an actual irradiating time by subtracting said waiting time from said reference irradiating time for irradiating said subsequent virtual recording cell and delaying irradiation initiation timing by said waiting time to irradiate with a laser beam during said actual irradiating time, thereby performing multi-level recording of information.

3. The optical recording method according to claim 1, further comprising the steps of:
    defining a predetermined waiting time for said neighboring subsequent virtual recording cell, in consideration of the amount heat stored by irradiating said preceding virtual recording cell with said laser beam, and
    setting an actual irradiating time by subtracting said waiting time from said reference irradiating time for irradiating said subsequent virtual recording cell and delaying irradiation initiation timing by said waiting time to irradiate with a laser beam during said actual irradiating time, thereby performing multi-level recording of information.

4. The optical recording method according to claim 2, further comprising the steps of:
    forming said plurality of recording marks by temporarily setting waiting time to approximately zero in a test recording region prepared on said optical recording medium,
    measuring whether the amount of heat stored in a preceding recording mark in said neighboring recording mark affects the formation of a subsequent recording mark, by reading the recording mark, and
    defining said predetermined waiting time by repeatedly increasing said waiting time gradually until said amount of heat provides an effect equal to or less than a predetermined allowable value to form and measure said plurality of recording marks.

5. The optical recording method according to claim 1, further comprising the steps of:
    an irradiation power of said laser beam, setting at least three stages of cooling power, waiting power, and recording power for forming said recording mark, so as to provide greater power in that order,
    setting recording irradiating time to five stages or more for irradiation of said virtual recording cell at said recording power,
    irradiating said virtual recording cell at said cooling power until predetermined time has elapsed from the termination of irradiation at said recording power, moreover, irradiating said subsequent virtual recording cell at said waiting power until irradiation at said recording power is initiated after the irradiation at said cooling power has been terminated, and
    irradiating said plurality of virtual recording cells at said recording power for the recording irradiating time modulated to five stages or more, thereby forming at least five types of recording marks having different sizes and performing multi-level recording of information.

6. The optical recording method according to claim 5, wherein a phase changing recording layer is employed as said recording layer, the phase changing recording layer being irradiated with a laser beam at said recording power to become amorphous and irradiated with a laser beam at said waiting power to become crystalline, and
    said virtual recording cell can be subjected to repeated multi-level recording.

7. The optical recording method according to claim 5, wherein the irradiating time at said cooling power is always made constant.

8. The optical recording method according to claim 5, wherein
    the longer said recording irradiating time at said preceding recording power, the shorter the irradiating time at said waiting power is set.

9. The optical recording method according to claim 8, wherein
    when said recording irradiating time assigned to said virtual recording cell is at least the longest of said five stages or more, the subsequent irradiating time at said waiting power is set generally to zero.

10. The optical recording method according to claim 1, wherein recording marks to be recorded onto said virtual recording cell include at least a recording mark smaller in size than a beam spot of said laser beam.

11. An optical recording medium, comprising a recording layer on an optically transparent substrate, allowing said recording layer to be irradiated with a laser beam to form a recording mark therein, wherein by an optical recording method, five types of more of recording marks having different sizes are formed in said plurality of virtual recording cells, the optical recording method comprises the steps of:

defining contiguously, on said recording layer, a virtual recording cell having a given unit length in a and having a given unit width in a direction orthogonal thereto, along said displacement direction, setting reference irradiating time of said virtual recording cell with said laser beam to five stages or more, irradiating with a laser beam of zero power or weak enough not to form a recording mark after irradiating with said laser beam for recording on a preceding virtual recording cell, and irradiating with a laser beam of zero power or weak enough not to form a recording mark before irradiating with a laser beam for recording on a neighboring subsequent virtual recording cell, and forming at least five types of recording marks having different sizes on said plurality of virtual recording cells to perform multi-level recording of information by modulating an optical reflectivity based on an area ratio to said virtual recording cell.

12. The optical recording medium according to claim 11, wherein the optical recording method further comprises the steps of:

defining a predetermined waiting time for said neighboring subsequent virtual recording cell, corresponding to the length of said reference irradiating time for said preceding virtual recording cell, and setting an actual irradiating time by subtracting said waiting time from said reference irradiating time for irradiating said subsequent virtual recording cell and delaying irradiation initiation timing by said waiting time to irradiate with a laser beam during said actual irradiating time, thereby performing multi-level recording of information.

13. The optical recording medium according to claim 11, wherein the optical recording method further comprises the steps of:

defining a predetermined waiting time for said neighboring subsequent virtual recording cell, in consideration of the amount heat stored by irradiating said preceding virtual recording cell with said laser beam, and setting an actual irradiating time by subtracting said waiting time from said reference irradiating time for irradiating said subsequent virtual recording cell and delaying irradiation initiation timing by said waiting time to irradiate with a laser beam during said actual irradiating time, thereby performing multi-level recording of information.

14. The optical recording medium according to claim 12 wherein, the optical recording method further comprises the steps of:

forming said plurality of recording marks by temporarily setting waiting time to approximately zero in a test recording region prepared on said optical recording medium, measuring whether the amount of heat stored in a preceding recording mark in said neighboring recording mark affects the formation of a subsequent recording mark, by reading the recording mark, and defining said predetermined waiting time by repeatedly increasing said waiting time gradually until said amount of heat provides an effect equal to or less than a predetermined allowable value to form and measure said plurality of recording marks.

15. The optical recording medium according to claim 11, wherein the optical recording method further comprises the steps of:

an irradiation power of said laser beam, setting at least three stages of cooling power, waiting power, and recording power for forming said recording mark, so as to provide greater power in that order, setting recording irradiating time to five stages or more for irradiation of said virtual recording cell at said recording power, irradiating said virtual recording cell at said cooling power until predetermined time has elapsed from the termination of irradiation at said recording power, moreover, irradiating said subsequent virtual recording cell at said waiting power until irradiation at said recording power is initiated after the irradiation at said cooling power has been terminated, and irradiating said plurality of virtual recording cells at said recording power for the recording irradiating time modulated to five stages or more, thereby forming at least five types of recording marks having different sizes and performing multi-level recording of information.

16. The optical recording medium according to claim 15, wherein a phase changing recording layer is employed as said recording layer, the phase changing recording layer being irradiated with a laser beam at said recording power to become amorphous and irradiated with a laser beam at said waiting power to become crystalline, and said virtual recording cell can be subjected to repeated multi-level recording.

17. The optical recording medium according to claim 15, wherein the irradiating time at said cooling power is always made constant.

18. The optical recording medium according to claim 15, wherein the longer said recording irradiating time at said preceding recording power, the shorter the irradiating time at said waiting power is set.

19. The optical recording medium according to claim 18, wherein when said recording irradiating time assigned to said virtual recording cell is at least the longest of said five stages or more, the subsequent irradiating time at said waiting power is set generally to zero.

20. The optical recording medium according to claim 11, wherein recording marks to be recorded onto said virtual recording cell include at least a recording mark smaller in size than a beam spot of said laser beam.

21. An optical recording medium, comprising a recording layer on an optically transparent substrate, allowing the recording layer to be irradiated with a laser beam to form a recording mark therein, wherein on said recording layer, a virtual recording cell having a given unit length in a displacement direction relative to that of said laser beam and having a given unit width in a direction orthogonal thereto is defined contiguously along said displacement direction, reference irradiating time of said virtual recording cell with said laser beam is set to five stages or more, a predetermined waiting time for said neighboring subsequent virtual recording cell is defined, corresponding to the length of said reference irradiating time for said preceding virtual recording cell, an actual irradiating time is set by subtracting said waiting time from said reference irradiating time for irradiating said subsequent virtual recording cell and delaying irradiation initiation timing by said waiting time to irradiate with a laser beam during said actual irradiating time, and at least five types of recording marks having different sizes formed on said plurality of virtual recording cells to perform multi-level recording of information by modulating an optical reflectivity based on an area ratio to said virtual recording cell.

22. The optical recording medium according to claim 21, wherein said plurality of recording marks are formed by temporarily setting waiting time to approximately zero in a test recording region prepared on said optical recording medium, whether the amount of heat stored in a preceding recording mark in said neighboring recording mark affects the formation of a subsequent recording mark is measured by reading the recording mark, and said predetermined waiting time is defined by repeatedly increasing said waiting time gradually until said amount of heat provides an effect equal to or less than a predetermined allowable value to form and measure said plurality of recording marks, thereby performing multi-level recording of information.

23. An optical recording medium, comprising a recording layer on an optically transparent substrate, allowing the recording layer to be irradiated with a laser beam to form a recording mark therein, wherein on said recording layer, a virtual recording cell having a given unit length in a displacement direction relative to that of said laser beam and having a given unit width in a direction orthogonal thereto is defined contiguously along said displacement direction, reference irradiating time of said virtual recording cell with said laser beam is set to five stages or more, and a predetermined waiting time is defined for said neighboring subsequent virtual recording cell in consideration of the amount heat stored by irradiating said preceding virtual recording cell with said laser beam, an actual irradiating time is set by subtracting said waiting time from said reference irradiating time for irradiating said subsequent virtual recording cell and delaying irradiation initiation timing by said waiting time to irradiate with a laser beam during said actual irradiating time, and at least five types of recording marks having different sizes formed on said plurality of virtual recording cells to perform multi-level recording of information by modulating an optical reflectivity based on an area ratio to said virtual recording cell.

24. An irradiating time controlling device for controlling irradiating time of a laser beam used for forming a recording mark on an optical recording medium having a recording layer on an optically transparent substrate, comprising a cell time setting portion for defining contiguously a predetermined cell time to thereby allow a virtual recording cell to be set contiguously at said recording layer corresponding to said cell time, a reference irradiating time setting portion for defining five stages or more of reference irradiating time within said cell time, an assignment processing portion for assigning said reference irradiating time to each of said plurality of cell times corresponding to a due recording mark, an actual irradiating time calculating portion for calculating waiting time in said subsequent neighboring cell time, corresponding to the length of said reference irradiating time assigned to said preceding cell time, and for determining actual irradiating time by subtracting said waiting time from said reference irradiating time assigned to said subsequent cell time, and an irradiation command portion 68 for providing a laser with a power ON timing delayed by said waiting time in said cell time, and for commanding said laser to maintain the power ON state over said actual irradiating time.

* * * * *